US008199753B2

(12) United States Patent
Mehta et al.

(10) Patent No.: US 8,199,753 B2
(45) Date of Patent: Jun. 12, 2012

(54) FORWARDING FRAMES IN A COMPUTER NETWORK USING SHORTEST PATH BRIDGING

(75) Inventors: Apurva Mehta, Cupertino, CA (US); Kumar Mehta, Cupertino, CA (US); Krishna Sankaran, Milpitas, CA (US); Rajagopalan Subbiah, San Jose, CA (US); Ramanarayanan Ramakrishnan, San Jose, CA (US); Bin William Hong, San Jose, CA (US); Ananda Sathyanarayana, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 170 days.

(21) Appl. No.: 12/478,857

(22) Filed: Jun. 5, 2009

(65) Prior Publication Data

US 2010/0309912 A1 Dec. 9, 2010

(51) Int. Cl.
*H04L 12/28* (2006.01)
*H04L 12/56* (2006.01)

(52) U.S. Cl. ................. 370/390; 370/392; 370/401
(58) Field of Classification Search .................. None
See application file for complete search history.

(56) References Cited

U.S. PATENT DOCUMENTS

| | | | |
|---|---|---|---|
| 6,275,492 B1 | 8/2001 | Zhang | |
| 7,688,756 B2 * | 3/2010 | Allan et al. ................ | 370/254 |
| 7,787,480 B1 | 8/2010 | Mehta et al. | |
| 2003/0161309 A1 | 8/2003 | Karuppiah | |
| 2007/0086361 A1 * | 4/2007 | Allan et al. ................ | 370/254 |
| 2007/0165657 A1 * | 7/2007 | Smith et al. ................ | 370/401 |
| 2007/0258446 A1 | 11/2007 | Smith et al. | |
| 2008/0089326 A1 | 4/2008 | Kotrla et al. | |
| 2008/0279196 A1 | 11/2008 | Friskney et al. | |
| 2009/0161669 A1 * | 6/2009 | Bragg et al. ................ | 370/389 |

(Continued)

FOREIGN PATENT DOCUMENTS

EP 1705840 A1 9/2006

(Continued)

OTHER PUBLICATIONS

D. Fedyk, M. Seaman, J. Farkas, "802.1aq Shortest Path Bridging May Recap", IEEE, http://www.ieee802.org/1/files/public/docs2009/aq-fedyk-SPB-recap_0509_v1.pdf, May 2009, entire document.*

(Continued)

*Primary Examiner* — Chirag Shah
*Assistant Examiner* — Suk Jin Kang
(74) *Attorney, Agent, or Firm* — Shumaker & Sieffert, P.A.

(57) ABSTRACT

Methods, apparatus, and products are disclosed for forwarding frames in a computer network using shortest path bridging ('SPB'). The network includes multiple bridges, and each edge bridge is assigned a unique service virtual local area network ('VLAN') identifier. One of the bridges receives a frame for transmission to a destination node. The received frame includes a service VLAN identifier for the ingress bridge through which the frame entered the network and a customer VLAN identifier. The one bridge identifies an SPB forwarding tree in dependence upon the service VLAN identifier. The SPB forwarding tree specifies a shortest route in the network from the ingress bridge through the one bridge to the other bridges in the network. The one bridge then forwards the received frame to the egress bridge without MAC-in-MAC encapsulation in dependence upon the SPB forwarding tree and the customer VLAN identifier.

21 Claims, 8 Drawing Sheets

U.S. PATENT DOCUMENTS

| | | | |
|---|---|---|---|
| 2009/0323706 A1* | 12/2009 | Germain et al. | 370/401 |
| 2010/0080238 A1* | 4/2010 | Allan et al. | 370/401 |
| 2010/0165995 A1 | 7/2010 | Mehta et al. | |
| 2010/0284418 A1* | 11/2010 | Gray et al. | 370/401 |
| 2010/0309912 A1 | 12/2010 | Mehta et al. | |
| 2010/0322254 A1* | 12/2010 | Takacs | 370/395.53 |
| 2011/0032936 A1* | 2/2011 | Ashwood-Smith et al. | 370/390 |

FOREIGN PATENT DOCUMENTS

| | | |
|---|---|---|
| EP | 1 858 212 A1 | 11/2007 |
| EP | 2 001 172 A2 | 12/2008 |
| WO | WO 2008/076052 | 6/2008 |
| WO | WO 2010/111142 A1 | 9/2010 |

OTHER PUBLICATIONS

D. Fedyk, "802.1aq Shortest Path Bridging Design Implications", IEEE, http://www.ieee802.org/1/files/public/docs2007/aq-fedyk-design-implications-0707-v1.0.pdf, Jul. 2007, entire document.*

D. Fedyk, M. Seaman, J. Farkas, A. Sajassi, "802.1aq Shortest Path Bridging Recap and Status", IEEE, http://www.ieee802.org/1/files/public/docs2008/aq-fedyk-SPB-Recap-Status-0708-v01.pdf, Jul. 2008, entire document.*

M. Seaman, "Virtual Bridged Local Area Network: P802.1aq/D1.0: Revision", IEEE, http://www.ieee802.org/1/files/public/docs2008/aq-seaman-cl08-suggested-changes-0708.pdf, Sep. 2008, entire document.*

D. Allan, P. Ashwood-Smith, N. Bragg, D. Fedyk, "Provider Link State Bridging", IEEE Communication Magazine, Sep. 2008, entire document.*

D. Fedyk, P. Bottorff, "Provider Link State Bridging (PLSB)", IEEE, http://www.ieee802.org/1/files/public/docs2007/aq-fedyk-provider-link-state-bridging-0107-01.pdf, Jan. 2007, entire document.*

Interworking Task Group of IEEE, "IEEE P802.1ah/D4.2—Virtual Bridged Local Area Networks—Amendment 6: Provider Backbone Bridges", Mar. 26, 2008.

IEEE Computer Society, "IEEE Std. 802.1D—2004; IEEE Standard for Local and metropolitan area networks Media Access Control (MAC) Bridges", Jun. 9, 2004.

IEEE Computer Society, "IEEE Std. 802.1ad—2005, IEEE Standard for Local and metropolitan area networks Virtual Bridged Local Area Networks, Amendment 4: Provider Bridges", May 26, 2006.

IEEE Computer Society, "IEEE Std. 802.1Q—2005, IEEE Standard for Local and metropolitan area networks Virtual Bridged Local Area Networks", May 19, 2006.

Sofia, Rute C., "A Survey of Advanced Ethernet Forwarding Approaches", IEEE Communications Surveys, IEEE, New York, NY, US, vol. 11, No. 1, Jan. 1, 2009, pp. 92-115, ISSN: 1553-877X *Chapters IV and V*.

Radia Perlman, Sun Microsystems, Donald Eastlake 3rd, Stellar Switches, Dinesh G. Dutt, Silvano Gai, Cisco Systems, Anoop Ghanwani, Brocade, Jun. 26, 2009, "RBridges: Base Protocol Specification <draft-ietf-trill-rbridge-protocol-13.txt>", Internet Engineering Task Force, IETF; Standard Working Draft, Internet Society (ISOC) 4, Rue Des Falaises CH-1205 Geneva, Switzerland.

Office Action mailed Jun. 27, 2011 in U.S. Appl. No. 12/508,949, 14 pgs.

Response to Office Action mailed Jun. 27, 2011 in U.S. Appl. No. 12/508,949, filed Sep. 27, 2011, 21 pgs.

Office Action received Mar. 28, 2012 in U.S. Appl. No. 12/344,644 17 pgs.

* cited by examiner

FORWARDING FRAMES IN A COMPUTER NETWORK USING SHORTEST PATH BRIDGING

CROSS-REFERENCE TO RELATED APPLICATION

This application is related to U.S. patent application Ser. No. 12/344,644 filed Dec. 29, 2008, which Applicants hereby incorporate by reference in its entirety.

This application is related to U.S. patent application Ser. No. 12/397,811 filed Mar. 4, 2009, which Applicants hereby incorporate by reference in its entirety.

TECHNICAL FIELD

The present invention relates to the field of computer networking, and in particular to a technique for forwarding frames in a computer network using shortest path bridging ('SPB').

BACKGROUND OF THE INVENTION

Early computer networks consisted of a small number of devices attached together using a single cable. Computer networks have since evolved, however, beyond a simple collection of attached devices. Current computer networks may connect thousands of devices spread across large local areas, and these local area networks may in turn be connected together to form still larger networks such as, for example, the Internet.

Today's computer networks often interconnect widely-disparate devices distributed throughout multiple local networks into a single virtual network. Virtual networking technology allows devices located on a single physical network to operate as part of multiple virtual networks. Such virtual networks provide flexibility not available in early computer networks and allow network administrators to create layers of abstraction to simplify complex network topologies. For example, using a virtual network, an enterprise may have a virtual blade server chassis with routers spread across multiple physical locations that allow a data center, which is split across multiple sites, to act as if the data center is at a single site.

The predominate standard used to construct and access today's computer networks is Ethernet. Ethernet is a family of frame-based computer networking technologies for local area networks. Ethernet is promulgated by the Institute of Electrical and Electronics Engineers (IEEE) in various standards specifications as part of the IEEE 802 family of standards. Ethernet defines a number of wiring and signaling standards for the Physical Layer of the Open Systems Interconnection (OSI) Networking Model, the means for network access at the Media Access Control (MAC) and Data Link Layer, and a common addressing format. At the physical layer, Ethernet networks are ubiquitous, carrying all kinds of traffic over multiple types of physical connections (wired or wireless), including 10 Mbps, 100 Mbps, 1 Gbps, 10 Gbps, 100 Gbps connections. The Ethernet service layer, generally referred to as Layer-2 because it is the MAC and Data Link Layer in the OSI networking model, provides the services generally required by a network. These network services typically include filtering, replication, forwarding broadcast, unicast, and multicast (BUM) traffic, and following a serviced topology, which may include virtual local area networks (VLANs), ATM segments of VLANs based on the ATM Lane Standard (ELANs), Ethernet Private Lines (ELINEs), and rooted multipoint Ethernet virtual connections (ETREEs).

VLAN services are specified in the IEEE 802.1Q standard and allow enterprise customers to configure various computing devices to communicate as if those devices were attached to the same broadcast domain, regardless of their physical locations. VLANs provide segmentation services traditionally provided by routers in local area network (LAN) configurations and address issues such as scalability, security, and network management. Bridges in VLAN topologies enforce the integrity of VLAN broadcast domains because such bridges are not permitted to bridge network traffic between VLANs. In this way, VLANs may provide broadcast filtering, security, address summarization, and traffic flow management. Network administrators may use VLANs to create multiple Layer 3 networks on the same Layer-2 bridge. For example if a Dynamic Host Configuration Protocol (DHCP) server, which broadcasts its presence, were plugged into a bridge, the DHCP server would serve any host device connected to the bridge. By using VLANs, however, a network administrator may easily split up the devices on the network so that some hosts will not use that DHCP server and will default to link-local addresses.

Because enterprise customers often have multiple networks distributed across multiple physical sites, customer's typically connected these physically separate networks together through the network of a network provider. For example, a company may connect its network at site A to its network at site B through a network provided by a telecommunications company. Despite the customer networks being connected through a provider network, devices on the different customer networks may still use VLAN services to communicate through the provider's network as though the devices were all located on the same LAN.

For the same reasons that enterprise customers take advantage of the VLAN services described in the IEEE 802.1Q specification, network providers also take advantage of VLAN services to provide flexibility, security, traffic flow management, and reduce their network administration burden. The drawback, however, is that under the IEEE 802.1Q specification, there are only 4096 identifiers available to specify different VLANs. Thus, a network provider and all the customers that provider serves must share the 4096 VLAN identifiers.

Because industry participants deemed such a limited number of VLAN identifiers inadequate to meet the needs of both customers and providers, the IEEE 802.1Q standard was amended by the IEEE 802.ad standard, often referred to as "Q-in-Q" or "stacked VLANs." The IEEE 802.ad standard sets forth an architecture and bridge protocol to provide separate instances of MAC network services to multiple independent users of a provider network in a manner that does not require cooperation among the customers, and requires a minimum of cooperation between the customers and the provider of the MAC network service. Q-in-Q provides customers with the ability to configure their own VLANs inside the VLAN provided to the customer by a service provider. In such a manner, the service provider may configure one service VLAN for the customer, and the customer can utilize that service VLAN to establish multiple customer VLANs.

To provide an overview of Ethernet header stacking of encapsulation, FIG. 1 sets forth a line drawing that illustrates exemplary Ethernet frame structures compliant with the IEEE 802.1 family of standards. FIG. 1 illustrates a traditional Ethernet frame 100 implemented in a customer's network according to the IEEE 802.1D standard. The customer frame 100 consists of a payload 101, a header type (EthType) 102 indicating that frame 100 is an 802.1D frame, a customer network source MAC address (C-SA) 103, and a customer network destination MAC address (C-DA) 104. The customer network source MAC address 103 specifies the source node in the customer network that originates the frame 100, while the customer network destination MAC address 104 specifies the destination node in the customer network to which the frame is bound for delivery.

As mentioned above, a customer may organize the nodes into various VLANs to provide traffic flow management, security, ease network administration, and the like. VLANs established by a customer for use within the customer's networks are generally referred to a 'customer VLANs.' In a network using customer VLANs, frame 100 is encapsulated as frame 110 to include a customer VLAN identifier (C-VID) 115 and a new header type (EthType) 116, indicating that the frame 110 is an 802.1Q frame. As used in this application, encapsulation may allow additional fields to be placed in any position relative to the encapsulated object, including interior to the original object, and does not require the additional fields be placed surrounding or at either end of the encapsulated object.

In a provider bridge (PB) network that bridges two customer networks, the frame 110 is further encapsulated as shown by frame 120, adding new fields for: a service VLAN identifier (S-VID) 127, and a new header type (EthType) 128 indicating the frame 120 is IEEE 802.1ad compliant.

For further explanation of header stacking or encapsulation in a IEEE 802.1ad provider bridge network, FIGS. 2 and 3 set forth network diagrams that illustrate an exemplary provider bridge network 200 interconnecting exemplary networks for customers A and B (201 and 202, respectively). In FIGS. 2 and 3, customer A 201 maintains three networks 203, 205, 207, while customer B 202 maintains two networks 204, 206. The provider bridge network 200 consists of six bridges, four provider edge bridges (PEB) 1-4 and two provider core bridges (PCB) 1-2. An edge bridge is a bridge through which frames ingress and egress the network 200—that is, an edge bridge is positioned at the 'edge' of the network topology. A core bridge is a bridge used to interconnect one or more edge bridges.

FIG. 2 illustrates a frame 220 at several stages as the frame 220 traverses the networks of FIG. 2 from customer equipment (CE)-11 210 in network 203 of customer A 201 to CE-31 212 in network 205 of customer A 201. In FIG. 2, the communications between CE-11 210 and CE-31 212 are implemented using a customer VLAN, and so the frame 220a from CE-11 210 is encapsulated with a customer VLAN header 230 that includes a customer VLAN identifier (C-VID) and a header type (EthType) specifying that the frame 220a is an IEEE 802.1Q compliant frame. The frame 220 includes a source MAC address (CE-11-SA) for CE-11 210, which indicates that CE-11 210 originated the frame 220a, and a destination MAC address (CE-31-DA) for CE-31 212, which indicates that the frame 220 is destined for CE-31 212.

When provider edge bridge (PEB)-1 240 receives the frame 220a, PEB-1 240 encapsulates the frame 220a into an 802.1ad frame 220b by adding a service VLAN header 231 to the frame 220. The service VLAN header 231 includes a service VLAN identifier (S-VID-A) assigned by the provider to customer A 201 and a header type (EthType) specifying that the frame is IEEE 802.1ad compliant. Using the service VLAN identifier and customer MAC addresses to identify devices in the networks 203, 205, 207 of customer A 201, the provider bridges learn information about the MAC addresses of the computing devices in customer A's networks. From the learned MAC information, the provider bridges route the frame 220 through the provider network 200 from the PEB-1 240 through which the frame 220 ingresses the network 200 to the PEB-3 242 through which the frame 220 egresses the network 200. PEB-3 242 then de-encapsulates the frame 220b by removing to service VLAN header 231, leaving IEEE 802.1Q compliant frame 220a for delivery to CE-31 212.

Similarly, in FIG. 3, computing device CE-15 310 in network 204 of customer B 202 sends an IEEE 802.1Q compliant frame 320a to device CE-25 312 customer B's network 206. At PEB-1 240, frame 320a is encapsulated with a service VLAN header 331. The service VLAN header 331 includes a service VLAN identifier (S-VID-B) assigned by the service provider to customer B 202 and a header type (EthType) specifying that the frame is IEEE 802.1ad compliant. The ingress bridge 240 of the provider network 200 forwards the frame 320b to the egress bridge 342 of the provider network 200, which in turn de-encapsulates the frame 320b by removing the service VLAN header 331, leaving IEEE 802.1Q compliant frame 320a for delivery to CE-35 312. As the provider bridges receive various frames on their ports, the bridges learn the MAC addresses of the devices in customer B network by monitoring the MAC addresses associated with each service VLAN identifier assigned to customer B 202 by the network provider.

From the description above, readers will note that in a provider bridge network, the service provider uses one or more service VLANs to transport frames for a customer's VLANs between multiple customer networks. To determine the forwarding path for each service VLAN through the provider's bridge network, the provider bridges often use the Generic VLAN registration protocol (GVRP) or the Multiple VLAN Registration Protocol (MVRP). For multicast traffic containment, provider bridges may use the Generic Attribute Registration Protocol Multicast Registration Protocol (GMRP) or the Multiple Multicast Registration Protocol (MMRP). For purposes of forwarding traffic, provider edge bridges learn all customer equipment MAC addresses and forward customer frames based on the service VLAN identifier and customer VLAN identifier pairs, while provider core bridges learn all customer equipment MAC addresses, but forward customer frames based only on the service VLAN identifiers. Within a particular provider bridge network, a given customer equipment MAC address is at the same site for all service VLANs.

As noted, the advantage of the networks described with reference to FIGS. 2 and 3 is that these networks overcome the 4096 VLAN namespace limitation inherent in IEEE 802.1Q networks through use of a second VLAN namespace—that is, the service VLAN namespace. For each service VLAN identifier used by a particular customer, that customer may create 4096 customer VLANs, which effectively allows for a maximum of 16,777,216 customer VLANs when considering that there are 4096 service VLANs available.

The drawback to current networks such as those in FIGS. 2 and 3, however, is that frames are forwarded through the network using spanning trees established using a spanning tree protocol. The spanning tree protocol is an OSI Layer-2 protocol that ensures a loop-free topology for any bridged LAN. This protocol allows a network design to include spare (redundant) links to provide automatic backup paths if an active link fails, without the danger of bridge loops, or the need for manual enabling or disabling of these backup links. Bridge loops must be avoided because such loops result in traffic that floods the network. A spanning tree protocol, such as the one defined in the IEEE 802.1D standard, creates a spanning tree within a mesh network of connected Layer-2 bridges, and disables those links that are not part of the tree, leaving a single active path between any two network nodes.

There are certain disadvantages to the spanning tree protocol used in the networks described above with reference to FIGS. 2 and 3. Because the spanning tree protocol disables links that are not part of the forwarding tree, bottlenecks are often created by concentrating traffic onto selected links. Also, due to the nature of the spanning tree protocol, temporary loops may develop if spanning tree messages are lost or as the network topology changes because nodes are brought on-line or taken off-line or moved in the network. During periods when temporary loops exists, frames may flood the network because the standard Ethernet header does not contain a time-to-live field or hop count that specifies when a frame has become stale and should be discarded. Further, the paths developed between nodes of the network are not necessarily the pair-wise shortest path, but rather are the paths that remain after the spanning tree protocol eliminates redundant paths.

To overcome the disadvantages of the spanning tree protocol in IEEE 802.1Q networks, designers have developed network architectures that allow shortest path bridging in these IEEE 802.1Q networks. As mentioned above, however, IEEE 802.1Q networks are limited to the use of 4096 VLAN identifiers. The network solutions currently implemented to provide shortest path bridging in these networks further reduce the number of available VLAN identifiers to 4096 divided by the number of edge bridges in the shortest path bridging network. For example, when an SPB network includes thirty-two such bridges, then only 128 VLAN identifiers are typically available for creating VLANs because the bridges utilize the other 3968 VLAN identifiers to implement shortest path bridging. Reducing the number of VLAN identifiers available in this network by such a large amount often deprives or greatly reduces the benefits that VLANs provide to customers.

BRIEF SUMMARY OF THE INVENTION

Methods, apparatus, and products are disclosed for forwarding frames in a computer network using shortest path bridging. Forwarding frames in a computer network using shortest path bridging according to embodiments of the present invention advantageously provides a shortest path bridging network without reducing the 4096 VLAN identifier based on the number of bridges in the SPB network and without requiring bridges that support MAC-in-MAC encapsulation. Rather, such bridges need only be updated with software improved for forwarding frames in a computer network using shortest path bridging according to embodiments of the present invention. In this manner, existing rack-mounted bridges which support IEEE 802.1ad may be utilized as bridges in networks that provide shortest path bridging.

In accordance with embodiments of the present invention, the network in which frames are routed using service VLAN identifiers includes a plurality of bridge nodes. Each edge bridge node is assigned a unique service VLAN identifier instead of assigning a VLAN identifier from the customer VLAN identifier space. At least one of the bridge nodes operates as an ingress bridge node through which the frames are received into the network, and at least one of the bridge nodes operates as an egress bridge node through which the frames are transmitted out of the network. One of the bridge nodes receives a frame for transmission to a destination node. The received frame enters the network through the ingress bridge node. The destination node connects to the network through the egress bridge node. The received frame includes a service VLAN identifier for the ingress bridge node and a customer VLAN identifier. The one bridge node identifies an SPB forwarding tree in dependence upon the service VLAN identifier. The SPB forwarding tree specifies a shortest route in the network from the ingress bridge node through the one bridge node to the other bridge nodes in the network. The one bridge node then forwards the received frame to the egress bridge node without MAC-in-MAC encapsulation in dependence upon the SPB forwarding tree and the customer VLAN identifier.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE SEVERAL VIEWS OF THE DRAWINGS

The accompanying drawings, which are incorporated in and constitute a part of this specification, illustrate implementations consistent with the present invention and, together with the detailed description, serve to explain advantages and principles consistent with the invention.

DETAILED DESCRIPTION OF THE INVENTION

While certain exemplary embodiments are described in detail and shown in the accompanying drawings, it is to be understood that such embodiments are merely illustrative of and not devised without departing from the basic scope thereof, which is determined by the claims that follow.

Although the following disclosure is discussed using terminology related to Ethernet links and various IEEE 802 standards, these are merely by way of example and illustration, and the scope of the present invention is not so limited, but extends to the fullest scope defined by the claims herein.

Although it is desirable for a network such as an IEEE 802.1Q network to be able to utilize all 4096 VLANs while providing shortest path bridging without MAC-in-MAC encapsulation, current bridging network solutions typically provide one of these desirable characteristics, but not both. Current network solutions provide full use of the 4096 VLANs inherent in IEEE 802.1Q networks by using stacked VLAN headers, often composed of a customer VLAN identifier and a service VLAN identifier. In these networks, however, frames are generally forwarded along routes generated using spanning tree protocols that often do not generate the most efficient paths pair-wise between ingress and egress points of the network.

When typical network solutions provide shortest path bridging, such networks use VLAN identifiers from only a single namespace, which permits up to 4096 VLANs. Because some of the VLAN identifiers are utilized to provide the shortest path bridging services, the number of available VLANs is reduced. In fact, the way many shortest path bridging networks are implemented, the maximum number of available VLANs is limited to 4096 divided by the number of edge bridges in the shortest path bridging network. For example, when an SPB network includes thirty-two such bridges, then only 128 VLAN identifiers are typically available for creating VLANs because the bridges utilize the other 3968 VLAN identifiers to implement shortest path bridging. When various bridges in a network, however, are modified for forwarding frames in a computer network using shortest path bridging according to embodiments of the present invention, such network solutions can provided shortest path bridging while keeping all 4096 VLAN identifiers available to implement customer VLANs.

Figure 1:
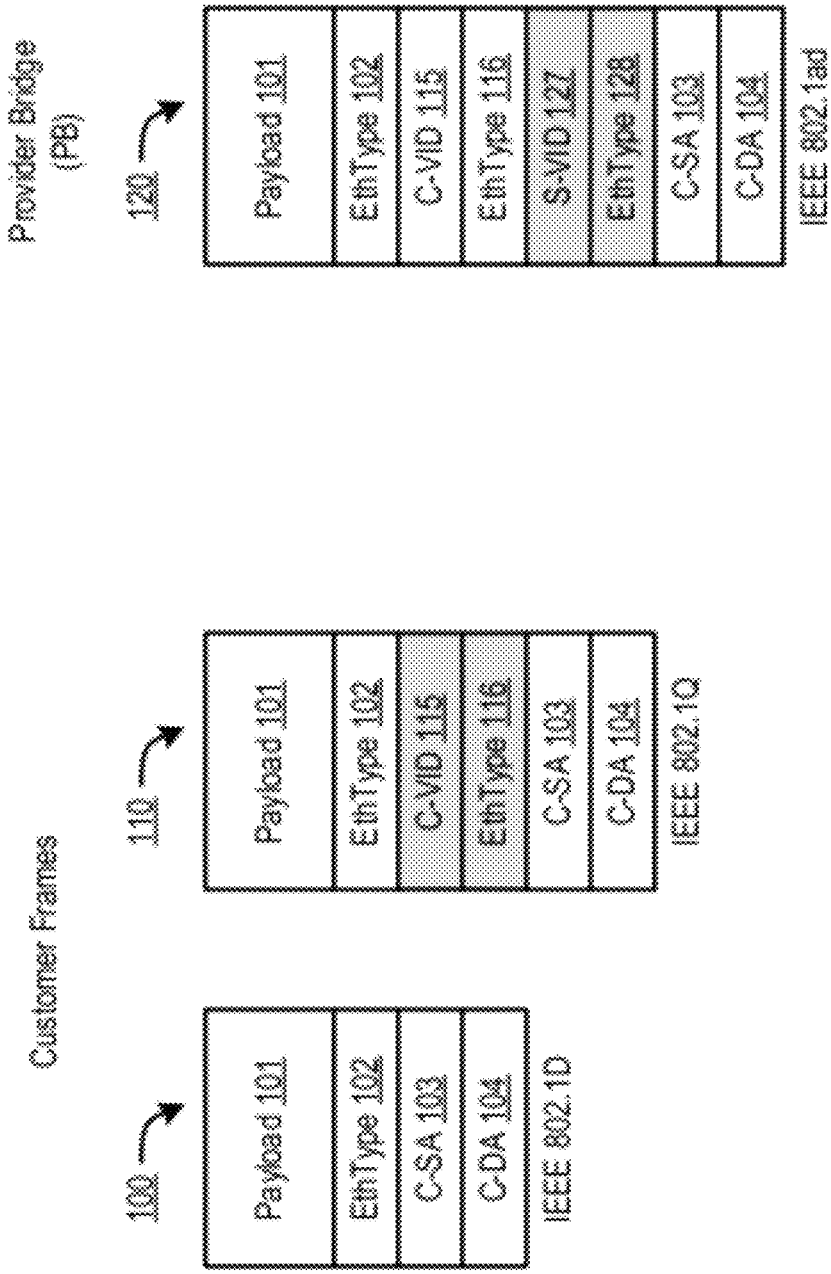
FIG. 1 sets forth a line drawing that illustrates exemplary Ethernet frame structures compliant with the IEEE 802.1 family of standards.
Figure 2:
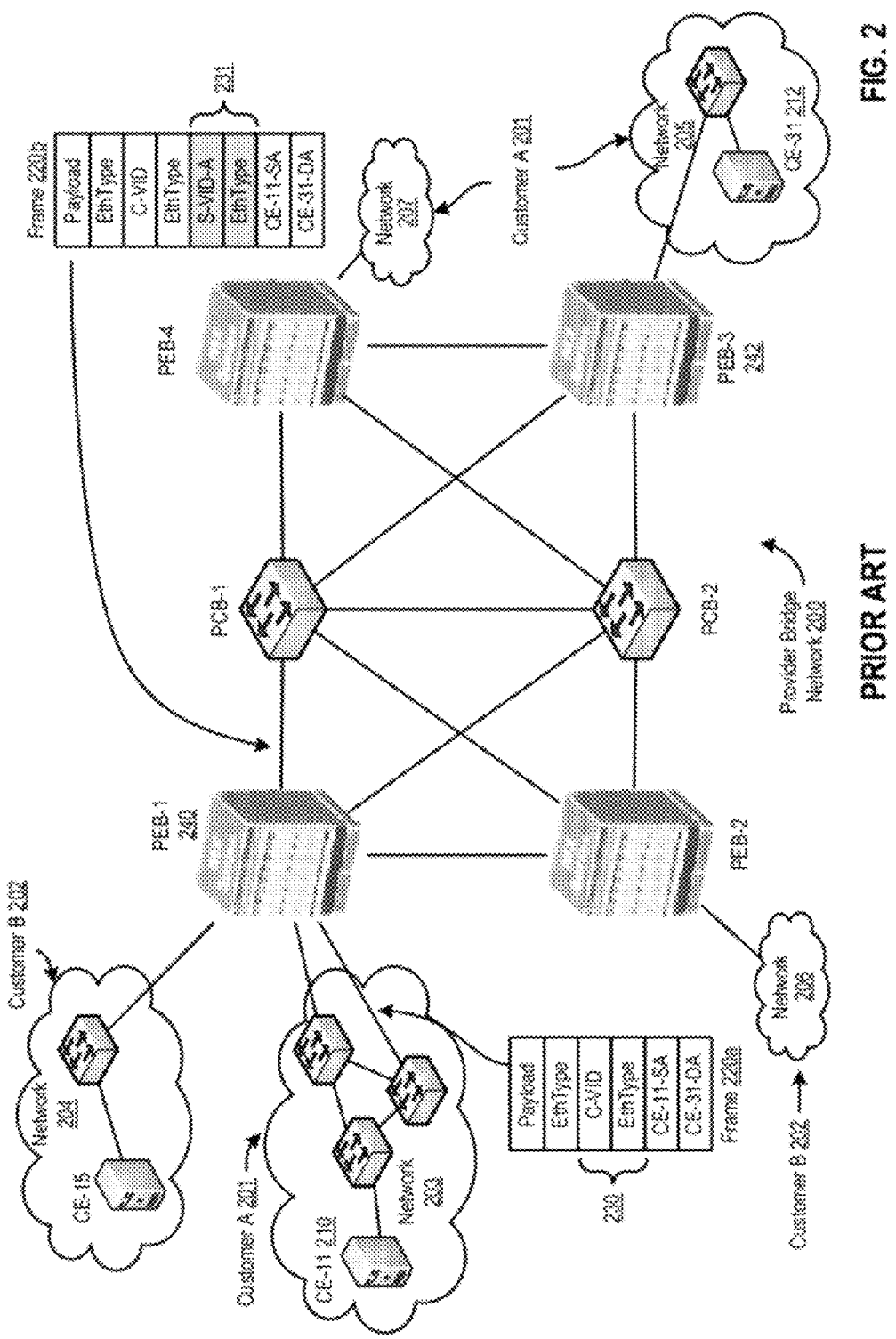
FIG. 2 sets forth a network diagram that illustrates an exemplary provider bridge network interconnecting exemplary customer networks.
Figure 3:
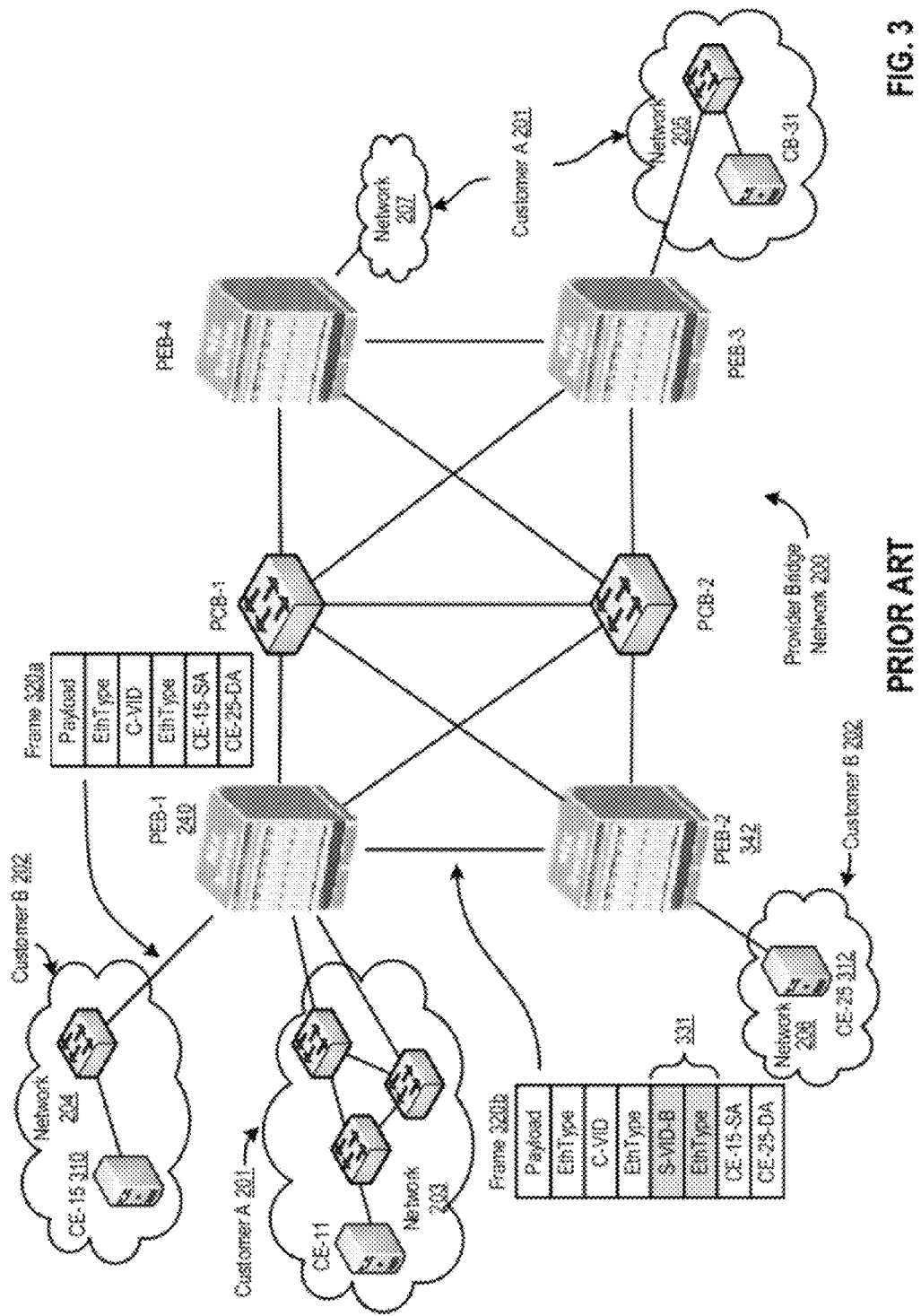
FIG. 3 sets forth a network diagram that illustrates an exemplary provider bridge network interconnecting exemplary customer networks.
Figure 4:
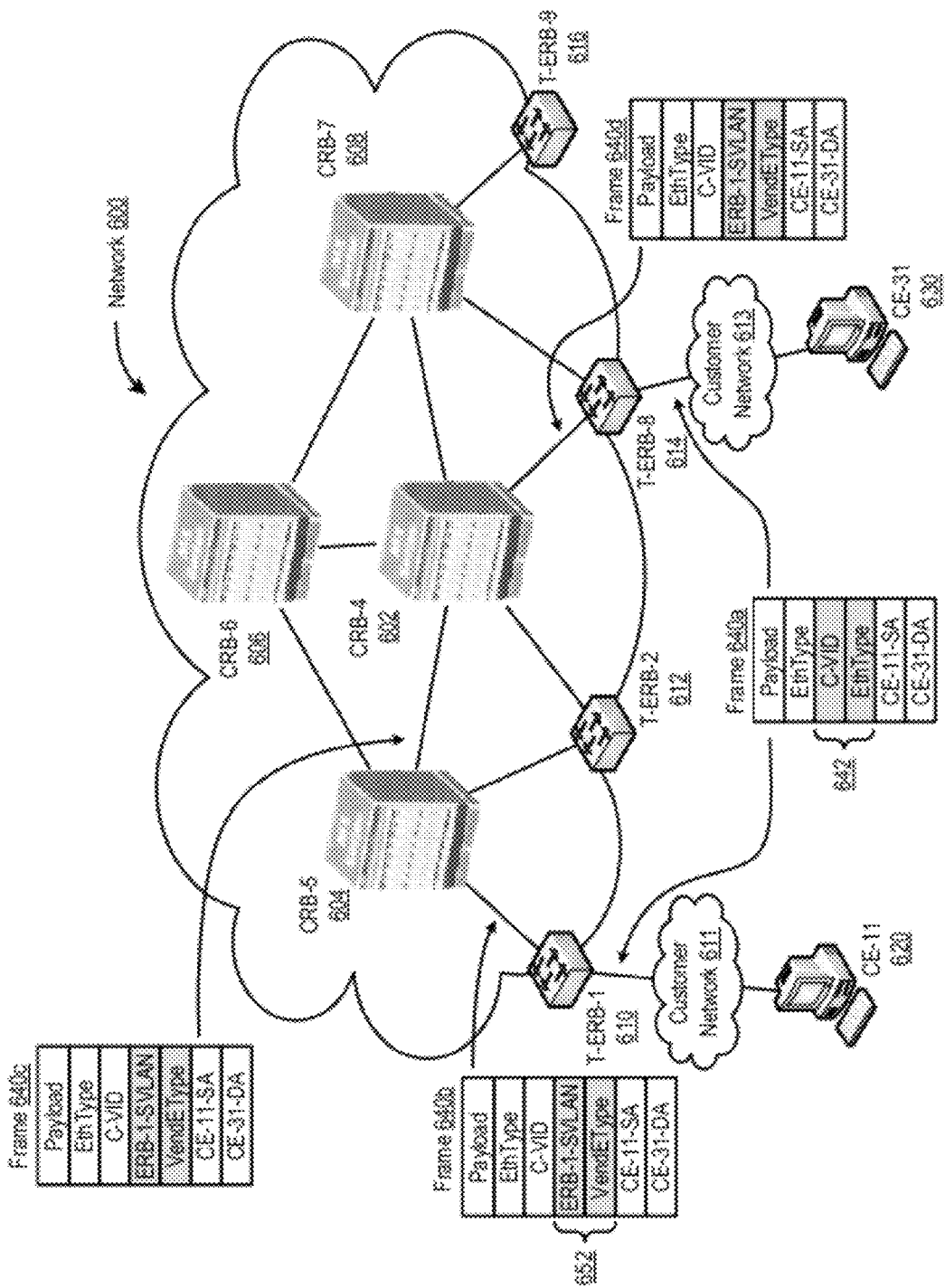
FIG. 4 sets forth a network diagram that illustrates a computer network having bridges that support forwarding frames in the computer network using shortest path bridging according to embodiments of the present invention.

For further explanation, FIG. 4 sets forth a network diagram that illustrates a network having bridges that support forwarding frames in a computer network using shortest path bridging according to embodiments of the present invention. The network of FIG. 4 includes four core router-bridges (CRB)—that is, CRB-4 602, CRB-5 604, CRB-6 606, and CRB-7 608—and four edge router-bridges implemented as top-of-rack devices (T-ERB)—that is, T-ERB-1 610, T-ERB-2 612, T-ERB-8 614, and T-ERB-9 616. In the example of FIG. 4, the network 600 interconnects customer equipment (CE)-11 620 and CE-31 630. CE-11 620 connects to the network 600 through T-ERB-1 610, while CE-31 630 connects to the network 600 through T-ERB-8 614.

FIG. 4 illustrates frame 640 in various stages as the frame 640 traverses the networks of FIG. 4. In FIG. 4, the network administrator managing CE-11 620 and CE-31 630 has grouped CE-11 620 and CE-31 630 into a customer VLAN for data communications. Accordingly, frame 640 of FIG. 4 includes a customer VLAN header 642 that includes a customer VLAN identifier (C-VID) identifying the particular customer VLAN to which the CE-11 620 and CE-31 630 are assigned. The VLAN header 642 also includes a header type (EthType) specifying that the frame is an IEEE 802.1Q compliant frame. The frame 640a also includes a source MAC address (CE-11-SA) designating CE-11 620 as the originator of the frame 640a and a destination MAC address (CE-31-DA) designating CE-31 630 as the destination node to which the frame 640 is transmitted.

In the example of FIG. 4, T-ERB-1 610 receives the frame 640a from CE-11 620 through customer network 611. T-ERB-1 610, along with other edge bridges in the network 600, utilizes service VLAN identifiers to route the frame 640 through the network 600. A service VLAN identifier is a VLAN identifier stored in a frame that identifies the edge bridge in a particular network through which the frame ingressed into the network. In the example of FIG. 4, frame 640b includes the service VLAN identifier "ERB-1-SVLAN," which specifies that frame 640b ingressed into the network 600 through edge bridge T-ERB-1 610. The service VLAN identifier often conforms to the IEEE 802.1ad standard, but is not required to do so.

In the example of FIG. 4, each edge bridge 610, 612, 614, and 616 is assigned a unique service VLAN identifier with which that edge bridge stores in each frame entering, or ingressing, into the network 600 from another computer network. The service VLAN identifiers may be assigned to each edge bridge by the service provider supplying the network 600. Often, however, the service VLAN identifier may be assigned to each edge bridge as part of negotiations among the bridges in the network 600 using any dynamic control protocol such as a protocol similar to the one described in the shortest path bridging specification promulgated by the IEEE as 802.1aq. Other dynamic control protocols as will occur to those of skill in the art, however, may also be used.

All bridges included in the SPB network 600 may be referred as SPB Bridges. Each SPB Bridge configures the links interconnecting that SPB Bridge to the other SPB Bridges in the network to accept frames having the service VLAN identifiers associated with all of the SPB Bridges. Additionally, all links interconnecting SPB Bridges may be configured with all customer VLANs.

T-ERB-1 610 of FIG. 4 has a service VLAN identifier of "T-ERB-1-SVLAN." The T-ERB-1 610 of FIG. 4 adds a service VLAN identifier (T-ERB-1-SVLAN) for the ingress bridge node 610 to the frame 640b so that as the frame travels through the network 600, the other bridge nodes will be able to identify that the frame ingressed into the network 600 from ingress bridge node 610 and use the appropriate SPB forwarding tree where the ingress bridge node 610 is the root of the tree. The T-ERB-1 610 of FIG. 4 adds a service VLAN identifier (T-ERB-1-SVLAN) to the frame 640b by adding a vender header 652 to the frame 640b that includes the service VLAN identifier (T-ERB-1-SVLAN). The vender header 652 is a customized header having a format defined by the vender of T-ERB-1 610. One of skill in the art will note, however, that many different header formats may be used.

An SPB forwarding tree is a data structure that specifies the shortest path through a network from a reference node in the network to any of the other nodes in the network. The reference node is often referred to as the "root" of the SPB forwarding tree because the reference node is the node from which the shortest path to the other nodes in the network is measured. The shortest path is often measured in terms of physical network hops—that is, the path through the network with the least number of physical hops is considered the shortest path. One of skill in the art, however, will note that the shortest path may be measured by other criteria such as, for example, the overall communications latency between the reference node and the other nodes in the network. In the example of FIG. 4, the shortest path is measured in terms of network hops between the ingress bridge node 610 and the egress bridge node 614, which results in core bridge node 604 being the next node along the shortest path.

A bridge node may be included in the shortest paths between several pairs of nodes in a network. Each bridge node may maintain multiple SPB forwarding trees, and each SPB forwarding tree typically has a different root. A bridge node may identify the appropriate SPB forwarding tree for a particular frame by looking up the service VLAN identifier in that frame, which specifies the node through which the frame ingressed into the network. In the example of FIG. 4, frame 640 includes the service VLAN identifier (ERB-1-SVLAN) for ingress bridge node 610 so that each bridge node receiving the frame may identify the SPB forwarding tree that has the ingress bridge node 610 as the root.

In the example of FIG. 4, T-ERB-1 610 forwards the frame 640b to a next bridge in the network 600 that is along the shortest path from the ingress bridge node 610 to the egress bridge node 614 through which the destination node 630 connects to the network 600—that is, CRB-5 604. T-ERB-1 610 of FIG. 4 routes the frame 640b based on both the customer VLAN identifier (C-VID) and the destination node address (CE-31-DA) for the destination node, CE-31 630. Using an SPB forwarding tree, T-ERB-1 610 of FIG. 4 looks up the port on which it previously received frames having the customer VLAN identifier and destination node address pair of "C-VID" and "CE-31-DA" and then transmits the frame 640 on that port to the next node in the network 600—that is, CRB-5 604.

CRB-5 604 of FIG. 4 receives the frame 640b from the ingress bridge T-ERB-1 610. At this point, the frame 640b includes a service VLAN identifier (ERB-1-SVLAN), a customer VLAN identifier (C-VID), and a destination node address (CE-31-DA). In the example of FIG. 4, CRB-5 604 identifies the SPB forwarding tree that it will use to forward the frame 640 based on the service VLAN identifier (ERB-1-SVLAN) included in the frame 640. Without using MAC-in-MAC encapsulation, CRB-5 604 then forwards the frame 640 toward the egress bridge node 614 based on customer VLAN identifier (C-VID) and the destination node address (CE-31-DA) included in the frame 640. That is, after selecting the proper SPB forwarding tree to use based on the service VLAN identifier (ERB-1-SVLAN), CRB-5 604 looks up the port for the next network hop toward the egress bridge node 614 that is associated with both the customer VLAN identifier (C-VID) and the destination node address (CE-31-DA) included in the frame 640. CRB-5 604 then transmits the frame 640 through that port to the next node along the shortest path to the egress node after using the service VLAN identifier (ERB-1-SVLAN) to identify the root of the shortest path tree. In FIG. 4, the next network hop toward the egress bridge node 614 is core bridge CRB-4 602. CRB-5 604 learned that the port leading to CRB-4 602 was associated with the customer VLAN identifier (C-VID) and the destination node address (CE-31-DA) included in the frame 640 when CRB-5 604 previously received frames from CRB-4 602 in which the customer VLAN identifier (C-VID) was associated with the network address for CE-31 when CE-31 originated the frames—that is, CRB-5 604 previously received frames with the customer VLAN identifier (C-VID) and the source MAC address of CE-31 630.

SPB Bridges described in this disclosure are not required to have any special hardware capabilities other than what is required for 802.1ad Edge-Bridges. Those of skill in the art will realize that such SPB Bridges can perform Reverse Path Forwarding Checks (RPFC) both for unicast as well as multicast frames by appropriately setting the Spanning Tree State for each port of an SPB Bridge, typically using port-service VLAN value pairs. Each service VLAN value pair specifies which port of a SPB Bridge on which that SPB Bridge can expect to receive a particular frame having a particular service VLAN. This is particularly useful when a frame is multicast through the SPB network because it allows the SPB Bridge to identify when the bridge receives a duplicate frame, or at least a frame from the wrong bridge, which the SPB bridge may then drop. SPB Bridges use existing IEEE 802.1ad hardware capabilities to perform this RPFC function.

MAC-in-MAC encapsulation refers to a protocol for forwarding frames in a network that have more than one destination MAC address—typically a interim destination MAC address and an ultimate destination MAC address. As the frame moves through a network utilizing MAC-in-MAC encapsulation, the interim destination MAC address is changed at each hop to reflect the next hop. Using MAC-in-MAC encapsulation, shortest path bridging may be provided in networks that overcome the 4096 VLAN limitation, but the hardware for many current bridge nodes does not support MAC-in-MAC encapsulation. In the example of FIG. 4, therefore, MAC-in-MAC encapsulation is not utilized to provide an SPB network that overcomes the 4096 VLAN limitation inherent in typical IEEE 802.1Q networks.

In the example of FIG. 4, CRB-4 602 receives the frame 640c from CRB-5 604. CRB-4 602 identifies the SPB forwarding tree that it will use to forward the frame 640 based on the service VLAN identifier (ERB-1-SVLAN) included in the frame 640. Without using MAC-in-MAC encapsulation, CRB-4 602 then forwards the frame 640 to the egress bridge node 614 based on customer VLAN identifier (C-VID) and the destination node address (CE-31-DA) included in the frame 640. CRB-4 602 forwards the frame 640 by looking up the port for the next network hop toward the egress bridge node 614 that is associated with both the customer VLAN identifier (C-VID) and the destination node address (CE-31-DA) included in the frame 640. CRB-4 602 then transmits the frame 640 through that port to the next node along the shortest path to the egress node, which is edge bridge node 614 in the example of FIG. 4.

T-ERB-8 614 of FIG. 4 receives the frame 640d from CRB-4 602 for transmission to CE-31 630. Upon examining the information in the frame 640d, T-ERB-8 614 determines that the frame 640 egresses the network 600 on the next network hop. In response to that determination, T-ERB-8 614 removes the service VLAN identifier (ERB-1-SVLAN) by removing the customized vender header, leaving in the example of FIG. 4 an IEEE 802.1Q compliant frame 640. T-ERB-8 614 then routes the frame 640 to the destination node CE-31 630 through customer network 613.

Figure 5:
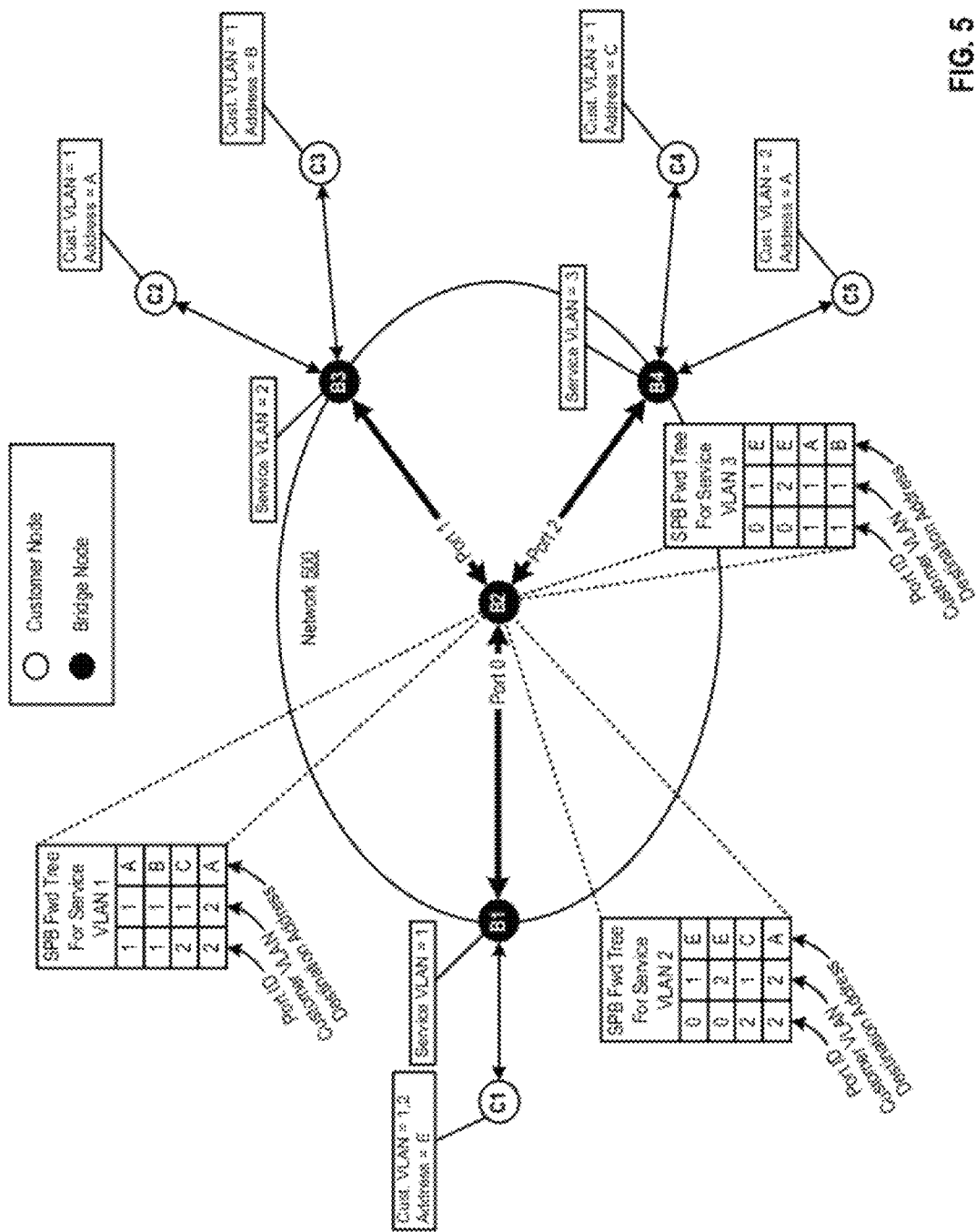
FIG. 5 sets forth exemplary shortest path bridging forwarding trees useful in forwarding frames in the computer network using shortest path bridging according to embodiments of the present invention.

In the example of FIG. 4, the bridge nodes use SPB forwarding trees to forward frames in a computer network using shortest path bridging according to embodiments of the present invention. For further explanation, FIG. 5 sets forth exemplary SPB forwarding trees useful in forwarding frames in a computer network 500 using shortest path bridging according to embodiments of the present invention. The network 500 of FIG. 5 includes four bridge nodes B1, B2, B3, and B4. Each edge bridge node is assigned a unique service VLAN identifier. In the example of FIG. 5, bridge node B1 is assigned a service VLAN identifier '1,' bridge node B3 is assigned a service VLAN identifier '2,' and bridge node B4 is assigned a service VLAN identifier '3.'

The network 500 of FIG. 5 provides shortest path bridging between customer nodes C1, C2, C3, C4, and C5. Each customer node is associated with at least one customer VLAN-network address pair. In the example of FIG. 5, customer node C1 is assigned to both customer VLANs '1' and '2' and has a network address of 'E.' Customer node C2 is assigned to customer VLAN '1' and has a network address of 'A.' In FIG. 5, Customer node C3 is assigned to customer VLAN '1' and has a network address of 'B.' Customer node C4 is assigned to customer VLAN '1' and has a network address of 'C.' Also, customer node C5 is assigned to customer VLAN '2' and has a network address of 'A.'

In the example of FIG. 5, bridge node B2 maintains three SPB forwarding trees. These SPB forwarding trees may be generated using any protocol as will occur to those of skill in the art such as, for example, the Intermediate System to Intermediate System (IS-IS) protocol. Each SPB forwarding tree is generated with a different edge bridge serving as the root because the shortest path for a frame through a network typically depends on the edge bridge through which the frame entered the network. The edge bridge serving as the root for a particular SPB forwarding tree may be identified by matching the service VLAN identifier associated with the SPB forwarding tree and the service VLAN identifier assigned to a particular edge bridge.

In the example of FIG. 5, the SPB forwarding tree for service VLAN identifier 1 is based on bridge node B1 being the root. Thus, bridge node B2 uses the SPB forwarding tree for service VLAN identifier 1 to forward frames received from bridge node B1. Bridge node B2 is able to identify the frames that entered the network 500 through bridge node B1 because bridge node B1 adds its service VLAN identifier 1 to each frame as the frame ingresses into the network 500.

In the example of FIG. 5, frames forwarded in the network 500 using shortest path bridging according to embodiments of the present invention may be implemented as unicast frames or multicast frames. A unicast frame is a frame that is sent from a source node to a single destination node, typically along a single path through the network. This is in contrast to a multicast frame that is sent from a source node to multiple destination nodes along multiple network paths. The manner in which frames are forwarded through the SPB network is slightly different depending whether the frame is unicast or multicast.

For unicast frames, bridge node B2 may then use the customer VLAN identifier and destination address pair to identify the port on which bridge node B2 should forward the frame so that the frame traverses through the network along the shortest path from the ingress bridge node to the frame's ultimate destination. In FIG. 5, for example, consider that bridge B2 receives a frame from customer node C1 through bridge B1 that is destined for customer node C5. Bridge node B2 will use the SPB forwarding table for service VLAN 1 to forward the frame because bridge node B1 will have stamped the frame with its service VLAN identifier 1, which informs all bridge nodes that the frame ingressed into the network 500 through bridge node B1. Using this forwarding table, bridge node B2 may lookup the port on which to forward a frame destined for customer node C5, which is specified using the customer VLAN and address pair of '2' and 'A' respectively. In the example of FIG. 5, the SPB forwarding table for service VLAN identifier 1 associates port 2 with customer VLAN identifier 2 and address A. Multicast frame forwarding is similar to unicast frame forwarding except that the destination node address in the forwarding table is not utilized. Broadcast, multicast, and unknown unicast frames are flooded based on customer VLAN identifier on the SPB forwarding tree specified by the service VLAN identifier.

In the example of FIG. 5, the SPB forwarding tree for service VLAN identifier 2 is based on bridge node B3 being the root. Thus, bridge node B2 uses the SPB forwarding tree for service VLAN identifier 2 to forward frames received from bridge node B3. Bridge node B2 is able to identify the frames that entered the network 500 through bridge node B3 because bridge node B3 adds its service VLAN identifier 2 to each frame as the frame ingresses into the network 500. Bridge node B2 may then use the customer VLAN identifier and destination address pair to identify the port on which bridge node B2 should forward the frame so that the frame traverses through the network along the shortest path from the ingress bridge node to the frame's ultimate destination. In FIG. 5, for example, consider that bridge B2 receives a frame from customer node C3 through bridge B3 that is destined for customer node C4. Bridge node B2 will use the SPB forwarding table for service VLAN 2 to forward the frame because bridge node B3 will have stamped the frame with its service VLAN identifier 2, which informs all bridge nodes that the frame ingressed into the network 500 through bridge node B3. Using this forwarding table, bridge node B2 may lookup the port on which to forward a frame destined for customer node C4, which is specified using the customer VLAN and address pair of '1' and 'C' respectively. In the example of FIG. 5, the SPB forwarding table for service VLAN identifier 2 associates port 2 with customer VLAN identifier 1 and address C.

In the example of FIG. 5, the SPB forwarding tree with bridge node B4 as root uses service VLAN identifier 3 as the SPB forwarding tree's identifier. Thus, bridge node B2 uses the SPB forwarding tree for service VLAN identifier 3 to forward frames received from bridge node B4. Bridge node B2 is able to identify the frames that entered the network 500 through bridge node B4 because bridge node B4 adds its service VLAN identifier 3 to each frame as the frame ingresses into the network 500. Bridge node B2 may then use the customer VLAN identifier and destination address pair to identify the port on which bridge node B2 should forward the frame so that the frame traverses through the network along the shortest path from the ingress bridge node to the frame's ultimate destination. In FIG. 5, for example, consider that bridge B2 receives a frame from customer node C4 through bridge B4 that is destined for customer node C1. Bridge node B2 will use the SPB forwarding table for service VLAN 3 to forward the frame because bridge node B4 will have stamped the frame with its service VLAN identifier 3, which informs all bridge nodes that the frame ingressed into the network 500 through bridge node B4. Using this forwarding table, bridge node B2 may lookup the port on which to forward a frame destined for customer node C1, which is specified using the customer VLAN and address pair of '1' and 'E' respectively. In the example of FIG. 5, the SPB forwarding table for service VLAN identifier 3 associates port 0 with customer VLAN identifier 1 and address E.

As stated previously, all the service VLANs which are used to identify the SPB root bridges must be configured on all the links between SPB bridges. Additionally, all links interconnecting SPB Bridges should be configured with all customer VLANs. When these conditions are satisfied, then one in the skill of art will note that the Layer 2 forwarding tables within the SPB domain will be identical for all service VLANs. Thus, a single table containing (Customer-VLANs, Customer-MACs) can be shared between all the service VLANs.

Figure 6:
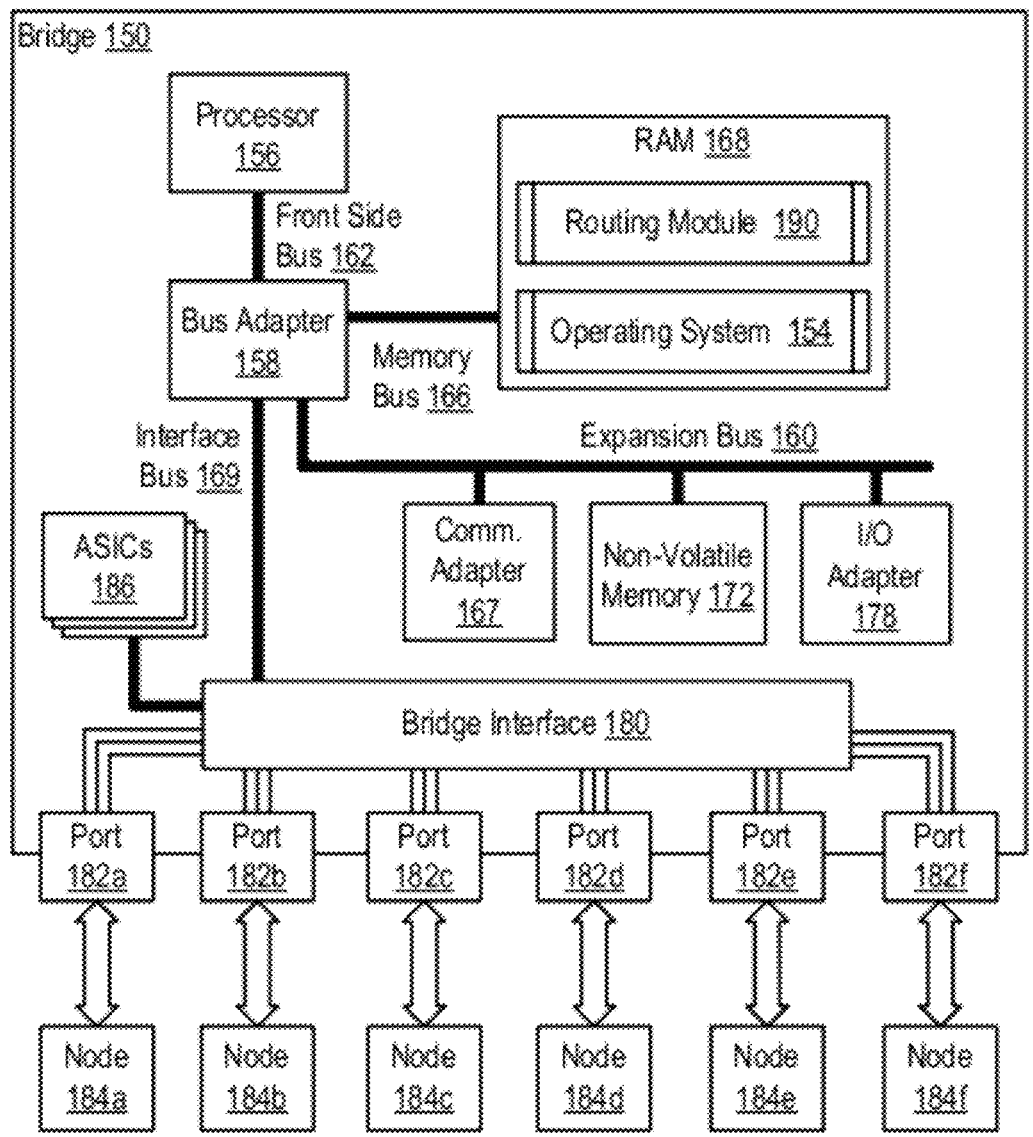
FIG. 6 sets forth a block diagram of automated computing machinery comprising an exemplary bridge useful in forwarding frames in a computer network using shortest path bridging according to embodiments of the present invention.

Forwarding frames in a computer network using shortest path bridging according to embodiments of the present invention is implemented generally with computers, that is, automated computing machinery. For further explanation, therefore, FIG. 6 sets forth a block diagram of automated computing machinery comprising an exemplary bridge 150 useful in forwarding frames in a computer network using shortest path bridging according to embodiments of the present invention. The bridge 150 of FIG. 6 is one of a plurality of bridge nodes included in the computer network. Each edge bridge node is assigned a unique service VLAN identifier. At least one of the bridge nodes in the network operates as an ingress bridge node through which the frames are received into the computer network. Also, at least one of the bridge nodes in the network operates as an egress bridge node through which the frames are transmitted out of the computer network.

In the example of FIG. 6, the exemplary bridge 150 includes at least one processor 156 or 'CPU' as well as random access memory 168 (RAM) which is connected through a high speed memory bus 166 and bus adapter 158 to the processor 156 and to other components of the exemplary bridge 150.

Stored in RAM 168 of FIG. 6 is a routing module 190. The routing module 190 of FIG. 6 is computer program instructions for forwarding frames in a computer network using shortest path bridging according to embodiments of the present invention. The network includes a plurality of bridge nodes. At least one of the plurality of bridge nodes operates as an ingress bridge node through which the frames are received into the network. At least one of the plurality of bridge nodes operates as an egress bridge node through which the frames are transmitted out of the network. In the network, each edge bridge node—that is, each ingress bridge node and each egress bridge node—is assigned a unique service VLAN identifier. Each edge bridge may be assigned a unique service VLAN identifier using any dynamic acquisition protocol as will occur to those of skill in the art.

The routing module 190 of FIG. 6 operates generally for forwarding frames in a computer network using shortest path bridging according to embodiments of the present invention by: receiving, by one of the plurality of bridge nodes, a frame for transmission to a destination node, the received frame entering the network through the ingress bridge node, the destination node connected to the network through the egress bridge node, the received frame including a service VLAN identifier for the ingress bridge node and a customer VLAN identifier; identifying, by the one bridge node, an SPB forwarding tree in dependence upon the service VLAN identifier, the SPB forwarding tree specifying a shortest route in the network from the ingress bridge node through the one bridge node to the other bridge nodes in the network; and forwarding, by the one bridge node to the egress bridge node without mac-in-mac encapsulation, the received frame in dependence upon the SPB forwarding tree and the customer VLAN identifier.

Also stored in RAM 168 is an operating system 154. Operating systems useful in bridges according to embodiments of the present invention may include Juniper Networks' JUNOS® and JUNOSE®, Cisco's IOS®, or Extreme Networks' ExtremeXOS®. Other operating systems that may be useful in bridges according to embodiments of the present invention may include lightweight versions of UNIX™, Linux™, Microsoft XP™, and others as will occur to those of skill in the art. Operating system 154 and routing module 190 in the example of FIG. 6 are shown in RAM 168, but many components of such software typically are stored in non-volatile memory 172 also, for example, Electrically Erasable Programmable Read-Only Memory (EEPROM) or in memory of the application-specific integrated circuits (ASICs) 186.

The bridge 150 of FIG. 6 includes a bridge interface 180 connected to the other component of the bridge 150 through the bus adapter 158. The bridge interface 180 provides ports 182 through which nodes 184a-f connected to the bridge 150. The nodes 184 may be implemented as servers, workstations, network devices, or any other computing device as will occur to those of skill in the art. The bridge interface 180 of FIG. 6 includes switching circuitry controlled by the processor 156 or ASICs 186. The switching circuitry of the bridge interface 180 provides high-speed switching services to rapidly receive frames on one port and forward those frames on to their ultimate destination through another port. The switching circuitry may also provided limited processing capabilities offloaded from the ASICs 186 or the processor 156.

In the example of FIG. 6, the ASICs 186 connected to the bridge interface 180 provide certain frame processing services in an effort to offload processing from the main processor 156. For example, the ASICs 186 may be used to provide filtering, replication, forwarding, encapsulation, or de-encapsulation services. Even still, the ASICs 186 may contain and execute all or a portion of the routing module 190 as described above.

The exemplary bridge 150 of FIG. 6 includes a bus adapter 158, a computer hardware component that contains drive electronics for the high speed buses, the front side bus 162 and the memory bus 166, as well as drive electronics for the interface bus 169 and the slower expansion bus 160. Through the expansion bus 160 of FIG. 6, the communications adapter 167, non-volatile memory 172, and I/O adapter 178 are connected to the other components of the exemplary bridge 150.

The exemplary bridge 150 of FIG. 6 includes one or more input/output ('I/O') adapters 178. I/O adapters 178 provide components that allow the processor 156 to interface with various I/O components of the bridge. Exemplary I/O components may include, for example, light-emitting diodes (LEDs), liquid-crystal displays (LCDs), physical switches and buttons, or other interface components as will occur to those of skill in the art.

The exemplary bridge 150 of FIG. 6 also includes a communications adapter 167 for data communications with other computing devices out of band from the network communications through ports 182a-f. The communications adapter 167 may provide the processor 156 with a interface according to the Universal Serial Bus (USB) specification, Small Computer System Interface (SCSI) specification, RS-232 specification, Inter-Integrated Circuit ($I^2C$) bus protocol, a System Management Bus (SMBus) protocol, an Intelligent Platform Management Bus (IPMB) protocol, or the like.

Readers will note that the exemplary implementation of the bridge 150 of FIG. 6 is for explanation only and not for limitation. Other computing architectures as will occur to those of skill in the art may also be useful for forwarding frames in a computer network using shortest path bridging according to embodiments of the present invention. For example, the bridge may be implemented using a general-purpose computer or a specialized computing device dedicated for network frame processing, or other hybrid architectures.

Figure 7:
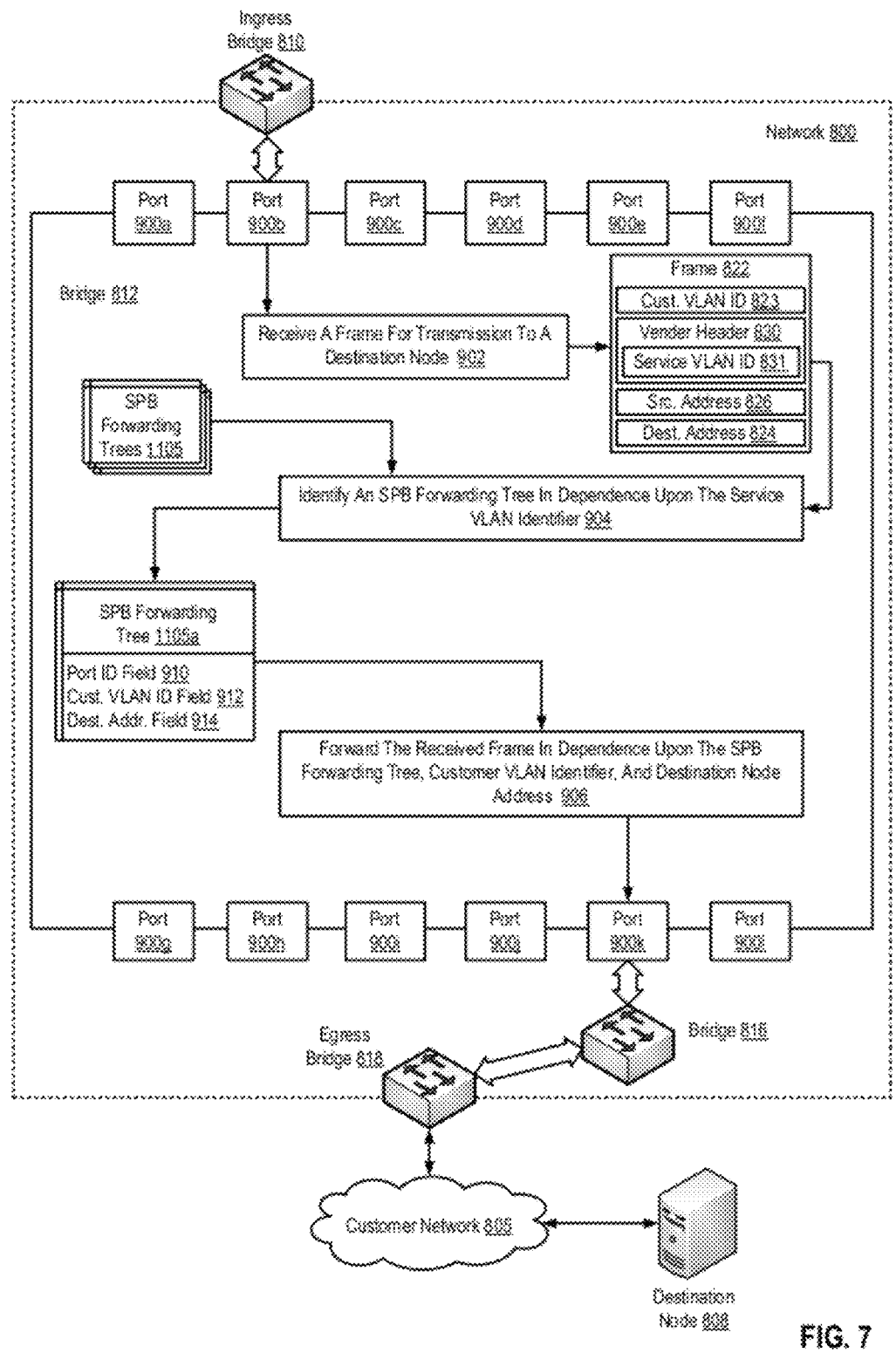
FIG. 7 sets forth a diagram illustrating an exemplary method of forwarding frames in a computer network using shortest path bridging according to embodiments of the present invention.
Figure 8:
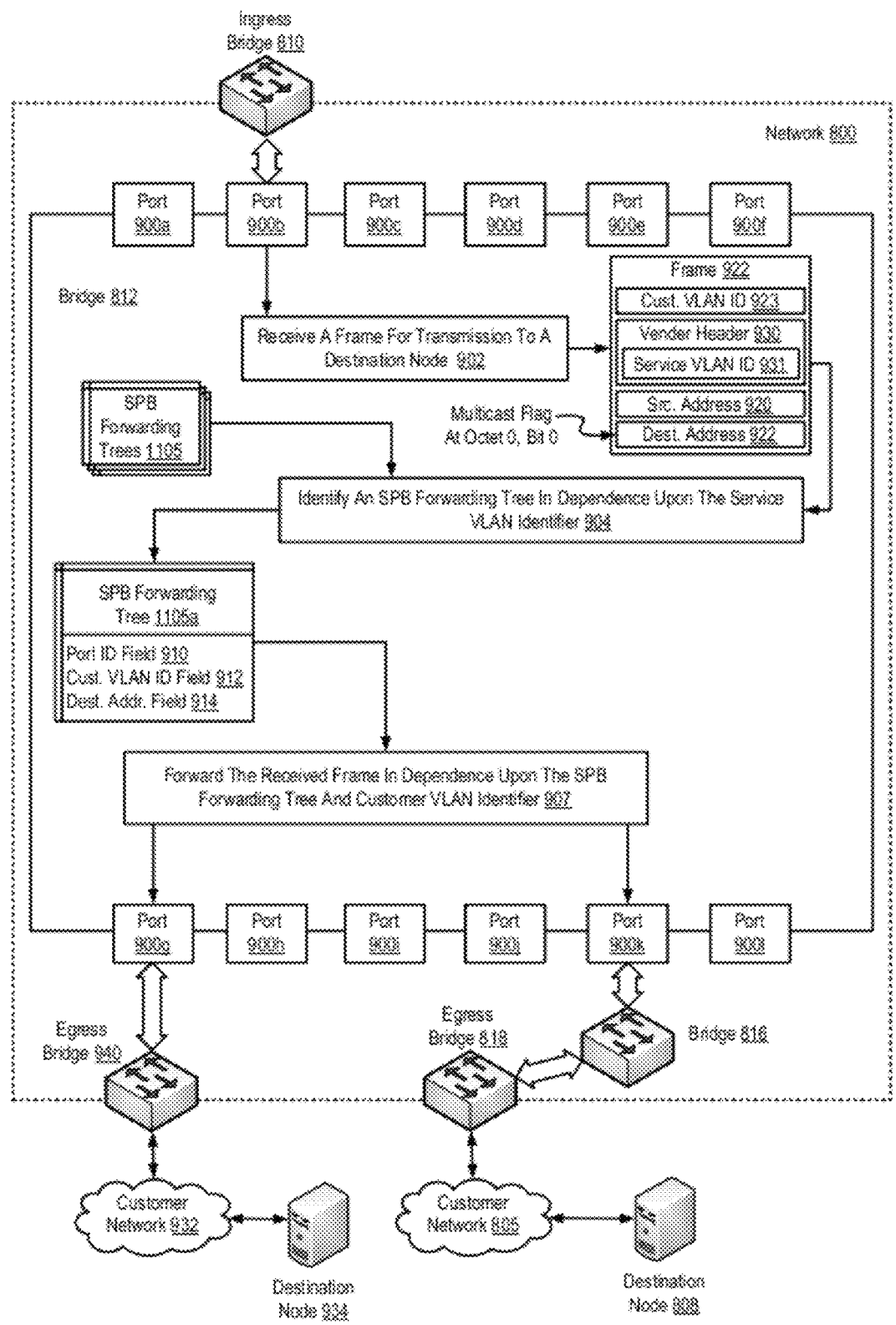
FIG. 8 sets forth a diagram illustrating a further exemplary method of forwarding frames in a computer network using shortest path bridging according to embodiments of the present invention.

FIGS. 7-8 provide further explanation of various embodiments of the present invention as different bridges operating according to embodiments of the present invention route a frame through a network. FIG. 7 sets forth a flow chart illustrating an exemplary method of forwarding frames in a computer network 800 using shortest path bridging according to embodiments of the present invention. The network 800 of FIG. 7 includes a plurality of bridge nodes 810, 812, 816, 818. In FIG. 7, bridge node 810 operates as an ingress bridge node through which the frames are received into the network 800, and bridge node 818 operates as an egress bridge node through which the frames are transmitted out of the network 800. In the example of FIG. 7, the hardware of the bridge nodes 810, 812, 816, 818 do not support MAC-in-MAC encapsulation or have any special hardware capabilities.

The bridge node 812 of FIG. 7 includes twelve ports 900a-l through which other nodes may connect to the bridge node 812. In the example of FIG. 7, the ingress bridge node 810 connects to the bridge node 812 through port 900b. Core bridge node 816 connects to the bridge node 812 through port 900k.

The method of FIG. 7 includes receiving 902, by the bridge node 812, a frame 822 for transmission to a destination node 808. In the example of FIG. 7, the destination node 808 is connected to the network 805 through the egress bridge node 818. The received frame 822 enters the network through the ingress bridge node 810. The bridge node 812 may receive 902 the frame 822 from the ingress bridge node 810 according to the method of FIG. 7 by retrieving the frame 822 from a reception stack for port 900b and advancing the stack pointer for the reception stack.

The frame 822 of FIG. 7 specifies a source node address 826 for the source node (not shown) originating the frame 822 and a destination node address 824 for a destination node 808 to which the frame 822 is transmitted. The source and destination node addresses 826, 824 may be implemented as MAC addresses. In the example of FIG. 7, the destination node address 824 indicates that the frame 822 is a unicast frame. A unicast frame is a frame that is sent from a source node to a single destination node, typically along a single path through the network. This is in contrast to a multicast frame that is sent from a source node to multiple destination nodes along multiple network paths. The destination node address 824 of FIG. 7 indicates that the frame 822 is a unicast frame by specifying a single network address that corresponds to destination node 808. In the cast of a multicast frame, however, multiple destination nodes may be specified in the destination address by setting bit 0 in octet 0, which operates as at multicast flag.

The frame 822 also includes a customer VLAN identifier 823 that the equipment on the customer network uses to assign the frame 822 to a particular VLAN established across one or more customer networks. The frame 822 further includes a vender header 830 that specifies a service VLAN identifier 831. The service VLAN identifier 831 of FIG. 7 and the frame 822 generally conform to the IEEE 802.1ad standard, but readers will recognize that such conformance is not a required feature in embodiments of the present invention.

The method of FIG. 7 also includes identifying 904, by the bridge node 812, an SPB forwarding tree 1105 in dependence upon the service VLAN identifier 831. Each SPB forwarding tree 1105 of FIG. 7 specifies the shortest routes in the network from one of the edge bridge nodes through the bridge node 812 to the other bridge nodes in the network. Each SPB forwarding tree 1105 is associated with a particular service VLAN identifier that identifies the edge bridge operating as the tree's root. When the frame 822 ingressed into the network 800, ingress bridge node added its unique service VLAN identifier 831 to the frame so that the other nodes in the network 800 could identify that the frame 822 entered the network at bridge 810 and utilize the SPB forwarding tree having bridge 810 as its root to route the frame to its destination through network 800 along the shortest path. In this way, when bridge node 812 receives the frame from the ingress bridge node 810, bridge node 812 may identify 904 the SPB forwarding tree 1105 having ingress bridge node 810 as its root by determining which SPB forwarding tree 1105 is associated with the service VLAN identifier 831 in the frame 822. Any given bridge node such as 812, can only have a single path leading back to the root (bridge node 810) of a given shortest path tree. For this reason, bridge node 812 would discard packets which were sent along the shortest path tree of bridge node 810 and which were received on any other port than 900b.

In the example of FIG. 7, SPB forwarding tree 1105a is associated with the service VLAN identifier 831 in the frame 822 and specifies the shortest route in the network from the ingress bridge node 810 through bridge node 812 to the other bridge nodes in the network 800. Each record of the SPB forwarding tree 1105a in the example of FIG. 7 represents the next hop for a frame to take along the shortest path to the frame's one or more ultimate destinations. Each record includes a customer VLAN identifier field 912 and a destination address field 914 to store values that uniquely identify a particular destination node. Both a customer VLAN identifier and a destination node address are utilized to identify a particular destination node because nodes assigned to different customer VLANs may have the same network address. Each record of the SPB forwarding tree 1105a also includes a port identifier field 910 that specifies the port connected to the next node along the shortest path to the destination node specified in the associated customer VLAN identifier field 912 and a destination address field 914.

The method of FIG. 7 includes forwarding 906, by bridge node 812 to the egress bridge node 818 without MAC-in-MAC encapsulation, the received frame 822 in dependence upon the SPB forwarding tree 1105a, the customer VLAN identifier 823, and the destination node address 824. The bridge node 812 may forward 906 the received frame 822 according to the method of FIG. 7 by identifying the port associated in the SPB forwarding tree 1105a with the customer VLAN identifier 823 and the destination node address 824—that is, port 900k. The bridge node 812 may then place the frame 822 in the transmission stack for the port 900k. Once frame 822 is placed in the transmission stack for a port 900k, the bridge interface, such as the bridge interface described with reference to FIG. 6, sends the frame 822 out from port 900k to the next bridge—that is, bridge 816. When the frame 822 reaches the egress bridge 818, the egress bridge 818 removes the service VLAN identifier for the ingress bridge node from the frame 822 and forwards the packet 822 to the customer network 805 for delivery to the destination node 808.

Forwarding frames in a computer network using shortest path bridging in the manner described with reference to FIG. 7 allows frame 822 to be sent along the shortest path from ingress node 810 through the network 800 to its ultimate destination at node 808 without reducing the number of available customer VLAN identifier and without using hardware that utilizes MAC-in-MAC encapsulation. Because many of the current generation of bridges do not support MAC-in-MAC encapsulation, the ability to use existing bridges without MAC-in-MAC encapsulation in a network reduces the financial costs of implementing shortest path bridging network solution.

FIG. 7 describes forwarding frames in a computer network using shortest path bridging according to embodiments of the present invention when a frame is a unicast frame. For further explanation of how embodiments of the present invention operate when the frames are multicast frames, FIG. 8 sets forth a flow chart illustrating a further exemplary method of forwarding frames in a computer network using shortest path bridging according to embodiments of the present invention.

The network topology of FIG. 8 is similar to the topology in FIG. 7. The network 800 of FIG. 8 includes a plurality of bridge nodes 810, 812, 816, 818. In FIG. 8, bridge node 810 operates as an ingress bridge node through which the frames are received into the network 800, and bridge node 818 operates as an egress bridge node through which the frames are transmitted out of the network 800. FIG. 8 also illustrates another bridge node 940 included in the network 800 that operates as an egress bridge node. Each edge bridge—that is, each ingress bridge node and each egress bridge node—is assigned a unique service VLAN identifier. The bridge nodes 812, 816 of FIG. 8 operate as core bridges. In the example of FIG. 8, the hardware of the bridge nodes 810, 812, 816, 818 do not support MAC-in-MAC encapsulation.

The bridge node 812 of FIG. 8 includes twelve ports 900a-l through which other nodes may connect to the bridge node 812. In the example of FIG. 8, the ingress bridge node 810 connects to the bridge node 812 through port 900b. Core bridge node 816 connects to the bridge node 812 through port 900k. The edge bridge node 940 of FIG. 8 connects to the bridge node 812 through port 900g.

The method of FIG. 8 includes receiving 902, by the bridge node 812, a frame 922 for transmission to a destination nodes 808, 934. In the example of FIG. 8, the destination node 808 is connected to the egress bridge node 818 through customer network 805, while the destination node 934 is connected the egress bridge node 940 through customer network 932. Although destination nodes 808, 934 are connected through different customer networks, destination nodes 808, 934 are assigned to the same customer VLAN. In the example of FIG. 8, the received frame 922 enters the network through the ingress bridge node 810. The frame 922 of FIG. 8 includes a source node address 920, a customer VLAN identifier 923, and a vender header 930 that specifies a service VLAN identifier 931—all similar to those described above with reference to FIG. 7. The bridge node 812 may receive 902 the frame 922 from the ingress bridge node 810 according to the method of FIG. 8 by retrieving the frame 922 from a reception stack for port 900b and advancing the stack pointer for the reception stack.

In the example of FIG. 8, the frame 922 is a multicast frame. That is, frame 922 is sent from the source node to multiple destination nodes along multiple network paths. The destination node address 922 of FIG. 8 indicates that the frame 822 is a multicast frame because bit 0 in octet 0, which operates as at multicast flag, is set.

The method of FIG. 8 also includes identifying 904, by the bridge node 812, an SPB forwarding tree 1105 in dependence upon the service VLAN identifier 931 in the frame 922. As previously mentioned, each SPB forwarding tree 1105 of FIG. 8 specifies the shortest routes in the network from one of the edge bridge nodes through the bridge node 812 to the other bridge nodes in the network. Each SPB forwarding tree 1105 is associated with a particular service VLAN identifier that identifies the edge bridge operating as the tree's root. When the frame 922 ingressed into the network 800, ingress bridge node 810 added its unique service VLAN identifier 931 to the frame so that the other nodes in the network 800 could identify that the frame 922 entered the network at bridge 810 and utilize the SPB forwarding tree having bridge 810 as its root to route the frame to its destination through network 800 along the shortest path. In this way, when bridge node 812 receives the frame from the ingress bridge node 810, bridge node 812 may identify 904 the SPB forwarding tree 1105 having ingress bridge node 810 as its root by determining which SPB forwarding tree 1105 is associated with the service VLAN identifier 931 in the frame 922.

In the example of FIG. 8, the SPB forwarding tree 1105a is associated with the service VLAN identifier 931 in the frame 922 and specifies the shortest route in the network from the ingress bridge node 810 through bridge node 812 to the other bridge nodes in the network 800. Each record of the SPB forwarding tree 1105a in the example of FIG. 8 represent the next hop for a frame to take along the shortest path to the frame's one or more ultimate destinations. Each record includes a customer VLAN identifier field 912 and a destination address field 914 to store values that uniquely identify a particular destination node. Each record of the SPB forwarding tree 1105a also includes a port identifier field 910 that specifies the port connected to the next node along the shortest path to the destination node specified in the associated customer VLAN identifier field 912 and a destination address field 914.

The method of FIG. 8 includes forwarding 907, by bridge node 812 to the egress bridge nodes 818, 940 without MAC-in-MAC encapsulation, the received frame 922 in dependence upon the SPB forwarding tree 1105a and the customer VLAN identifier 923. The bridge node 812 may forward 907 the received frame 922 according to the method of FIG. 8 by identifying the ports associated in the SPB forwarding tree 1105a with the customer VLAN identifier 923—that is, ports 900g, 900k. The bridge node 812 may then place the frame 922 in the transmission stack for each port 900g, 900k. Once frame 922 is placed in the transmission stack for ports 900g, 900k, the bridge interface, such as the bridge interface described with reference to FIG. 6, sends the frame 922 out from ports 900g, 900k to the next bridge—that is, bridge 816. When the frame 922 reaches the egress bridges 818, 940 the egress bridges 818, 940 remove the service VLAN identifier for the ingress bridge node 810 from the frame 922 and forward the packet 922 to the customer network 805, 932 for delivery to the destination nodes 808, 934.

Forwarding frames in a computer network using shortest path bridging in the manner described with reference to FIG. 7 allows frame 822 to be sent along the shortest path from ingress node 810 through the network 800 to its ultimate destination at node 808 without reducing the number of available customer VLAN identifier and without using hardware that utilizes MAC-in-MAC encapsulation. Because many of the current generation of bridges do not support MAC-in-MAC encapsulation, the ability to use existing bridges without MAC-in-MAC encapsulation in a network reduces the financial costs of implementing shortest path bridging network solution.

The description above focuses on embodiments of the present invention in which there is only one service VLAN identifier per edge bridge. To support load-balancing of customer VLANs, however, a particular SPB edge bridge may be configured to allow frames to ingress the SPB network along more than one SPB forwarding tree. In such a configuration, each SPB edge bridge could have multiple service VLAN identifiers, each service VLAN identifier specifying a different SPB forwarding tree. Traffic for each customer VLAN would be mapped by the SPB edge bridge to only one service VLAN identifier and corresponding SPB forwarding tree. Such a configuration would provide the functionality of Equal Cost Multiple Trees for load-balancing customer VLANs in the SPB domain.

Exemplary embodiments of the present invention are described largely in the context of a fully functional network bridges configured for forwarding frames in a computer network using shortest path bridging. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of forwarding frames in a computer network using shortest path bridging ('SPB'), the computer network including a plurality of bridge nodes, each edge bridge node assigned a unique service virtual local area network ('VLAN') identifier, at least one of the plurality of bridge nodes operating as an ingress bridge node through which the frames are received into the computer network, and at least one of the plurality of bridge nodes operating as an egress bridge node through which the frames are transmitted out of the computer network, the method comprising the steps of:
receiving, by one of the plurality of bridge nodes, a frame for transmission to a destination node, the received frame entering the network through the ingress bridge node, the destination node connected to the network through the egress bridge node, the received frame including the unique service VLAN identifier for the ingress bridge node and a customer VLAN identifier, wherein the received frame comprises a vender header specified by a vender of the ingress bridge node, the vender header including the service VLAN identifier;
identifying, by the one bridge node, an SPB forwarding tree based upon the service VLAN identifier, the SPB forwarding tree specifying a shortest route in the network from the ingress bridge node through the one bridge node to the other bridge nodes in the network; and
forwarding, by the one bridge node to the egress bridge node without media access control ('MAC')-in-MAC encapsulation, the received frame based upon the SPB forwarding tree and the customer VLAN identifier.

2. The method of claim 1 wherein the received frame is a multicast frame.

3. The method of claim 1 wherein:
the received frame is a unicast frame that includes a destination node address for the destination node; and
the step of forwarding the received frame based upon the SPB forwarding tree and the customer VLAN identifier further comprises the step of forwarding the received frame based upon the destination node address.

4. The method of claim 1 further comprising the step of adding, by the ingress bridge node, the service VLAN identifier for the ingress bridge node to the received frame.

5. The method of claim 1 further comprising the step of removing, by the egress bridge node, the service VLAN identifier for the ingress bridge node from the received frame.

6. The method of claim 1 wherein the service VLAN identifier conforms to the Institute of Electrical and Electronics Engineers ('IEEE') 802.1ad standard and the customer VLAN identifier conforms to the IEEE 802.1Q standard.

7. The method of claim 1 wherein hardware of the one bridge node does not support MAC-in-MAC encapsulation.

8. An apparatus for forwarding frames in a computer network using shortest path bridging ('SPB'), the computer network including a plurality of bridge nodes, the apparatus operating as one of the plurality of bridge nodes, each edge bridge node assigned a unique service virtual local area network ('VLAN') identifier, at least one of the plurality of bridge nodes operating as an ingress bridge node through which the frames are received into the computer network, and at least one of the plurality of bridge nodes operating as an egress bridge node through which the frames are transmitted out of the computer network, the apparatus comprising:
a computer memory storing a computer program, the computer program comprising instructions that when executed cause the apparatus to:
receive a frame for transmission to a destination node, the received frame entering the network through the ingress bridge node, the destination node connected to the network through the egress bridge node, the received frame including the unique service VLAN identifier for the ingress bridge node and a customer VLAN identifier, wherein the received frame comprises a vender header specified by a vender of the ingress bridge node, the vender header including the service VLAN identifier,
identify an SPB forwarding tree based upon the service VLAN identifier, the SPB forwarding tree specifying a shortest route in the network from the ingress bridge node through the one bridge node to the other bridge nodes in the network, and
forward, to the egress bridge node without media access control ('MAC')-in-MAC encapsulation, the received frame based upon the SPB forwarding tree and the customer VLAN identifier; and
a processor that is operatively coupled to the computer memory and executes the instructions.

9. The apparatus of claim 8 wherein the received frame is a multicast frame.

10. The apparatus of claim 8 wherein:
the received frame is a unicast frame that includes a destination node address for the destination node; and
the instructions that when executed cause the apparatus to forward the received frame based upon the SPB forwarding tree and the customer VLAN identifier further comprise instructions that when executed cause the apparatus to forward the received frame based upon the destination node address.

11. The apparatus of claim 8 wherein the ingress bridge node adds the service VLAN identifier for the ingress bridge node to the received frame.

12. The apparatus of claim 8 wherein the egress bridge node removes the service VLAN identifier for the ingress bridge node from the received frame.

13. The apparatus of claim 8 wherein the service VLAN identifier conforms to the Institute of Electrical and Electronics Engineers ('IEEE') 802.1ad standard and the customer VLAN identifier conforms to the IEEE 802.1Q standard.

14. The apparatus of claim 8 wherein hardware of the apparatus does not support MAC-in-MAC encapsulation.

15. A non-transitory computer-readable medium for forwarding frames in a computer network using shortest path bridging ('SPB'), the computer network including a plurality of bridge nodes, each edge bridge node assigned a unique service virtual local area network ('VLAN') identifier, at least one of the plurality of bridge nodes operating as an ingress bridge node through which the frames are received into the computer network, and at least one of the plurality of bridge nodes operating as an egress bridge node through which the frames are transmitted out of the computer network, the computer-readable medium encoded with instructions that are executed by one or more processors in a data processing system to perform the steps of:

receiving, by one of the plurality of bridge nodes, a frame for transmission to a destination node, the received frame entering the network through the ingress bridge node, the destination node connected to the network through the egress bridge node, the received frame including the unique service VLAN identifier for the ingress bridge node and a customer VLAN identifier, wherein the received frame comprises a vender header specified by a vender of the ingress bridge node, the vender header including the service VLAN identifier;

identifying, by the one bridge node, an SPB forwarding tree based upon the service VLAN identifier, the SPB forwarding tree specifying a shortest route in the network from the ingress bridge node through the one bridge node to the other bridge nodes in the network; and forwarding, by the one bridge node to the egress bridge node without media access control ('MAC')-in-MAC encapsulation, the received frame based upon the SPB forwarding tree and the customer VLAN identifier.

16. The non-transitory computer-readable medium of claim 15 wherein the received frame is a multicast frame.

17. The non-transitory computer-readable medium of claim 15 wherein:

the received frame is a unicast frame that includes a destination node address for the destination node; and the step of forwarding the received frame based upon the SPB forwarding tree and the customer VLAN identifier further comprises the step of forwarding the received frame based upon the destination node address.

18. The non-transitory computer-readable medium of claim 15 wherein the instructions further comprise additional instructions that are executed by at least one of the processors in the data processing system to perform the step of adding, by the ingress bridge node, the service VLAN identifier for the ingress bridge node to the received frame.

19. The non-transitory computer-readable medium of claim 15 wherein the instructions further comprise additional instructions that are executed by at least one of the processors in the data processing system to perform the step of removing, by the egress bridge node, the service VLAN identifier for the ingress bridge node from the received frame.

20. The non-transitory computer-readable medium of claim 15 wherein the service VLAN identifier conforms to the Institute of Electrical and Electronics Engineers ('IEEE') 802.1ad standard and the customer VLAN identifier conforms to the IEEE 802.1Q standard.

21. The non-transitory computer-readable medium of claim 15 wherein hardware of the one bridge node does not support MAC-in-MAC encapsulation.

\* \* \* \* \*